US011336939B2

(12) United States Patent
Glasgow et al.

(10) Patent No.: US 11,336,939 B2
(45) Date of Patent: *May 17, 2022

(54) DYNAMIC CONTENT REORDERING

(71) Applicant: eBay Inc., San Jose, CA (US)

(72) Inventors: Dane Glasgow, Los Altos, CA (US); Matthew Bret MacLaurin, Santa Cruz, CA (US); David Eramian, Mountain View, CA (US); Corinne Sherman Stewart, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,661

(22) Filed: Jan. 12, 2021

(65) Prior Publication Data
US 2021/0136436 A1 May 6, 2021

Related U.S. Application Data

(63) Continuation of application No. 16/379,095, filed on Apr. 9, 2019, now Pat. No. 10,904,601, which is a
(Continued)

(51) Int. Cl.
*H04N 7/10* (2006.01)
*H04N 7/025* (2006.01)
(Continued)

(52) U.S. Cl.
CPC . *H04N 21/26241* (2013.01); *H04N 21/23424* (2013.01); *H04N 21/2547* (2013.01);
(Continued)

(58) Field of Classification Search
CPC ....... H04N 21/23424; H04N 21/26241; H04N 21/2547; H04N 21/25434;
(Continued)

(56) References Cited

U.S. PATENT DOCUMENTS 7,735,104 B2  6/2010  Dow et al.
8,918,430 B2  12/2014  Fischer
(Continued)

FOREIGN PATENT DOCUMENTS

CN   10-1079721 A   11/2007
CN   10-3051939 A    4/2013
(Continued)

OTHER PUBLICATIONS

U.S. Appl. No. 16/379,095, filed Apr. 9, 2019, Issued.
(Continued)

*Primary Examiner* — Gigi L Dubasky
(74) *Attorney, Agent, or Firm* — Schwegmen Lundberg & Woessner, P.A.

(57) ABSTRACT

In various example embodiments, a system and method for dynamically ordering content and discrete content segments are presented. A set of discrete content segments is received having a first order for distributing the set of discrete content segments during a display of a media stream. Each discrete content segment includes a set of ordering factors. Event data is received. The event data is representative of a set of events depicted by the media stream. A set of event instances is determined from the event data representing the set of events depicted by the media stream. A second order is generated for the set of discrete content segments based on the set of event instances and the sets of ordering factors.

20 Claims, 7 Drawing Sheets

Related U.S. Application Data continuation of application No. 15/278,992, filed on Sep. 28, 2016, now Pat. No. 10,298,983, which is a continuation of application No. 14/738,670, filed on Jun. 12, 2015, now Pat. No. 9,473,804.

(51) Int. Cl.

| | | |
|---|---|---|
| *H04N 21/262* | (2011.01) | |
| *H04N 21/2668* | (2011.01) | |
| *H04N 21/2547* | (2011.01) | |
| *H04N 21/2543* | (2011.01) | |
| *H04N 21/442* | (2011.01) | |
| *H04N 21/258* | (2011.01) | |
| *H04N 21/234* | (2011.01) | |
| *H04N 21/81* | (2011.01) | |
| H04H 60/33 | (2008.01) | |

(52) U.S. Cl.
CPC .. *H04N 21/25435* (2013.01); *H04N 21/25891* (2013.01); *H04N 21/2668* (2013.01); *H04N 21/26208* (2013.01); *H04N 21/44218* (2013.01); *H04N 21/812* (2013.01); *H04H 60/33* (2013.01)

(58) Field of Classification Search
CPC ......... H04N 21/25891; H04N 21/2668; H04N 21/26208; H04N 21/44218; H04N 21/812; H04N 21/25435
See application file for complete search history.

(56) References Cited

U.S. PATENT DOCUMENTS

| | | | |
|---|---|---|---|
| 9,473,804 | B1 | 10/2016 | Glasgow et al. |
| 9,967,621 | B2 | 5/2018 | Armstrong et al. |
| 10,298,983 | B2 | 5/2019 | Glasgow et al. |
| 10,904,601 | B2 | 1/2021 | Glasgow et al. |
| 2004/0221311 | A1 | 11/2004 | Dow et al. |
| 2009/0150919 | A1* | 6/2009 | Lee ..................... H04N 21/235 725/10 |
| 2010/0017820 | A1 | 1/2010 | Thevathasan et al. |
| 2012/0054246 | A1 | 3/2012 | Fischer |
| 2013/0160051 | A1* | 6/2013 | Armstrong ........... H04N 21/462 725/34 |
| 2015/0106854 | A1 | 4/2015 | Fabian et al. |
| 2017/0019698 | A1 | 1/2017 | Glasgow |
| 2020/0045356 | A1 | 2/2020 | Glasgow et al. |

FOREIGN PATENT DOCUMENTS

| | | |
|---|---|---|
| CN | 10-3747301 A | 4/2014 |
| CN | 10-4620591 A | 5/2015 |
| CN | 10-7637086 A | 1/2018 |
| CN | 10-7637086 B | 3/2020 |
| KR | 10-2015-0006928 A | 1/2015 |
| WO | 2016/201043 A1 | 12/2016 |

OTHER PUBLICATIONS

U.S. Appl. No. 15/278,992, filed Sep. 28, 2016, Issued.
U.S. Appl. No. 14/738,670, filed Jun. 12, 2015, Issued.
U.S. Appl. No. 14/738,670, U.S. Pat. No. 9,473,804, filed Jun. 12, 2015, Dynamic Content Reordering.
U.S. Appl. No. 15/278,992, U.S. Pat. No. 10,298,983, filed Sep. 28, 2016, Dynamic Content Reordering.
U.S. Appl. No. 16/379,095, U.S. Pat. No. 10,904,601, filed Apr. 9, 2019, Dynamic Content Reordering.
Notice of Allowance received for U.S. Appl. No. 16/379,095, dated Sep. 17, 2020, 10 pages.
Notice of Decision to Grant Received for Chinese Patent Application No. 201680033738.5, dated Dec. 4, 2019, 3 pages (1 page of Official Copy and 2 pages of English translation).
Final Office Action received for U.S. Appl. No. 16/379,095, dated Jun. 29, 2020, 14 pages.
Non-Final Office Action received for U.S. Appl. No. 16/379,095, dated Feb. 20, 2020, 14 pages.
Written Opinion received for PCT Application No. PCT/US2016/036594, dated Sep. 8, 2016, 4 pages.
International Search Report received for PCT Application No. PCT/US2016/036594, dated Sep. 8, 2016, 3 pages.
Notice of Allowance received for U.S. Appl. No. 14/738,670, dated Jun. 22, 2016, 9 pages.
Final Office Action received for U.S. Appl. No. 15/278,992, dated Nov. 3, 2017, 14 pages.
Non-Final Office Action received for U.S. Appl. No. 15/278,992, dated May 5, 2017, 11 pages.
Non-Final Office Action received for U.S. Appl. No. 15/278,992, dated May 31, 2018, 15 pages.
Notice of Allowance received for U.S. Appl. No. 15/278,992, dated Jan. 2, 2019, 9 pages.
Supplemental Notice of Allowability Received for U.S. Appl. No. 15/278,992, dated Apr. 5, 2019, 2 pages.
International Preliminary Report on Patentability received for PCT Application No. PCT/US2016/036594, dated Dec. 21, 2017, 6 pages.
Notice of Allowance received for Korean Patent Application No. 10-2018-7001162, dated Dec. 21, 2018, 3 pages (1 page of English Translation and 2 pages of Official copy).
Notice of Allowance received for Korean Patent Application No. 10-2019-7008220,dated Jun. 18, 2019, 3 pages (1 pages of English Translation and 2 pages of Official Copy).
Office Action received for Chinese patent Application No. 201680033738.5, dated Aug. 2, 2019, 8 pages (3 pages of Official Copy and 5 pages of English Translation).

\* cited by examiner

DYNAMIC CONTENT REORDERING

PRIORITY

This application is a continuation of and claims the benefit of priority to U.S. patent application Ser. No. 16/379,095, filed Apr. 9, 2019, now U.S. Pat. No. 10,904,601, which is a continuation of and claims the benefit of priority to U.S. patent application Ser. No. 15/278,992, filed Sep. 28, 2016, now U.S. Pat. No. 10,298,983, which is a continuation of and claims the benefit of priority to U.S. patent application Ser. No. 14/738,670, filed on Jun. 12, 2015, now U.S. Pat. No. 9,473,804, each of which is hereby incorporated by reference herein in its entirety.

TECHNICAL FIELD

Embodiments of the present disclosure relate generally to data processing and, more particularly, but not by way of limitation, to dynamic content reordering.

BACKGROUND

Conventionally, advertisements may be placed within a media stream based on a bidding process, whereby advertisers bid on predetermined advertisement slots. Pricing for advertisement slots may vary throughout a given media stream and be influenced by a time of day at which the slot occurs, a program being transmitted within the media stream, and a relative time of year for a broadcast season. Sections of a media stream may include national advertisement portions and local advertisement portions. National advertisement portions of a media stream may be partitioned into slots for advertisements to be displayed across a given nation in which the media stream is broadcast or otherwise distributed. Local advertisement portions may be partitioned into slots for advertisements limited to a specific locality in which the media stream is broadcast. As such, once a media stream reaches a specific locality, the local advertisement slots may be sold using a similar process as outlined generally above.

BRIEF DESCRIPTION OF THE DRAWINGS

Various ones of the appended drawings merely illustrate example embodiments of the present disclosure and cannot be considered as limiting its scope.

Figure 1:
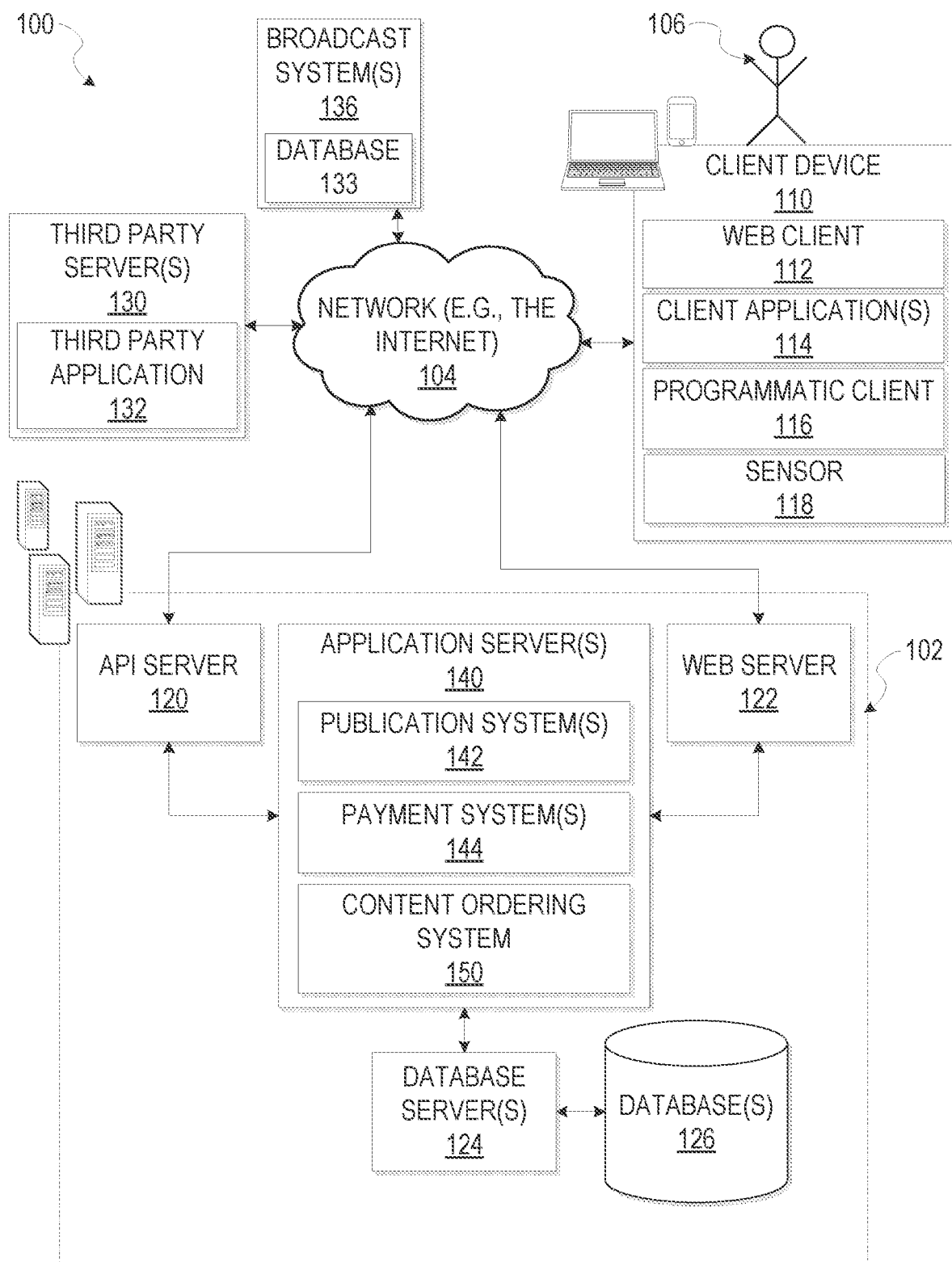
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Conventional advertisement schemes lack an ability to direct content to display locations within a locality and specific viewing audiences within the locality or the display location based on a composition and identifying characteristics of subjects viewing a media stream in which the content appears. Further, conventional content delivery schemes lack an ability to contextually order content within the media stream so as to display content at a favorable time during the transmission of the media stream or to an audience at a time in which the audience is most likely to be susceptible to or positively receive the content.

In various example embodiments, systems and methods for a content ordering system for dynamically ordering or reordering discrete content segments within a content stream or media stream are presented. For example, a set of discrete content segments can be a set of advertisements to be partitioned into a set of content segment slots within a broadcast media stream (e.g., a scripted television program, a live television broadcast, a sporting event, etc.). The content ordering system disclosed can receive the set of content segments along with a set of criteria, factors, or contextual information for the content segments indicating a desired time, event, or audience mood at which the content segments are to be displayed. In addition, the content ordering system can receive sensor data from devices broadcasting the media stream or sensors associated with the device broadcasting the media stream in order to determine characteristics, attitudes, attention levels, emotional reactions, and the like for subjects perceived by the sensors and consuming the media stream.

For example, a content producer may produce a content segment linking the content producer with a specific sports franchise or team. The content producer may place a bid to display the content segment within the media stream depicting a game being played by the team. The bid may include a frequency for displaying the content segment and a context for displaying the content segment (e.g., display the content segment after the high point of the first quarter for the team, display the content segment three times during the game but not after a play or call that is negative for the team, display the content segment after a touchdown by the team, etc.). The content ordering system may determine an order for the content segment and other content segments within a content stream. For example, the order of the content segment may be based on events within the media stream (e.g., the score of the game for either team, etc.), the subjects consuming the media stream (e.g., an order based on detecting that the subjects are fans of the team relating to the content segment), or both. The content ordering system may also reorder the content segments based on changes in the program, an occurrence of one or more specified events (e.g., events with a probability of occurrence but not a guarantee of occurrence), changes in reactions or attention of the subjects consuming the media stream, or combinations thereof. The content producer may have the content segment displayed at times when the subjects are more likely to positively receive the content segments, more likely to view and be attentive to the display of the content segment, and other factors positively affecting the reception of the content segment by the audience.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or a wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The one or more client devices 110 may comprise, but are not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes, televisions, smart televisions, or any other communication device that a user may utilize to access the networked system 102. In some embodiments, the client device 110 may comprise a display module (not shown) to display information (e.g., in the form of user interfaces). The client device 110 may also include or be associated with a set of sensors 118. In further embodiments, the set of sensors 118 of the client device 110 may comprise one or more of touch screens, accelerometers, gyroscopes, cameras, microphones, global positioning system (GPS) devices, and so forth. The client device 110 may be a device of a user that is used to receive a media stream (e.g., a broadcast of a television program, a transmission of an online program, a transmission of a streaming entertainment service, etc.) within the networked system 102 or transmitted to the client device 110 by a broadcast system 136 or a third party server 130. In one embodiment, the networked system 102 is a network-based marketplace that responds to requests for product listings, publishes publications comprising item listings of products available on the network-based marketplace (e.g., media products, media streams, and downloadable media content), and manages payments for marketplace transactions. One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may include one or more applications (also referred to as "apps") such as, but not limited to, a web browser, messaging application, electronic mail (email) application, e-commerce site application (also referred to as a marketplace application), and the like. The e-commerce site application may enable transmission of a media stream (e.g., an online movie, a video game, a video, a television program, etc.) and purchase of items (e.g, physical items, digital items, media items, etc.). In some embodiments, if the e-commerce site application is included in the client device 110, then this application is configured to locally provide a user interface and at least some functionalities of an e-commerce site and to communicate with the networked system 102, on an as needed basis, for data and/or processing capabilities not locally available (e.g., access to a database of items available for sale, to authenticate a user, to verify a method of payment, access to a database of advertising content, access to a database or service for streaming media content, etc.). Conversely if the e-commerce site application is not included in the client device 110, the client device 110 may use its web browser to access the e-commerce site (or a variant thereof) hosted on the networked system 102.

The one or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and content ordering systems 150, each of which may comprise one or more modules or applications, and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information, in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by a third party. The third party website, for example, provides one or more promotional, marketplace, or payment functions, streaming media content, or downloadable media content that are supported by the relevant applications of the networked system 102.

The publication systems 142 may provide a number of publication functions and services to users 106 that access the networked system 102. The payment systems 144 may likewise provide a number of functions to perform or facilitate payments, transactions, transmission of media streams, and downloading of media content. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The content ordering system 150 may provide functionality operable to dynamically order or reorder discrete content segments within one or more streams of content based on sensor data and events within a media stream. For example, the content ordering system 150 may receive a content stream including a set of discrete content segments from the databases 126, the third party servers 130, the publication system 142, the broadcast system 136, or other sources. The content ordering system 150 may additionally receive sensor data from a display location for the content stream. In some instances, the content ordering system 150 receives event data of a media stream from the broadcast system 136.

In some example embodiments, the content ordering system 150 may analyze the sensor data to order the discrete content segments of the content stream based on the sensor data. In some instances, where the set of discrete content segments is provided in a first order for transmission within the content stream, the content ordering system 150 can cause a reordering to present the set of discrete content segments in a second order based on one or more of the sensor data and the events within the media stream. As more sensor data is received and more events occur within the media stream, the content ordering system 150 can further refine and subsequently redefine the order in which the set of discrete content segments is presented within the content stream. In some example embodiments, the content ordering system 150 may communicate with the publication systems 142 (e.g., accessing discrete content segments), the payment system 144, and the broadcast system 136. In an alternative embodiment, the content ordering system 150 may be a part of the publication system 142 or the broadcast system 136.

Further, while the client-server-based network architecture 100 shown in FIG. 1 is a client-server architecture, the present inventive subject matter is of course not limited to such an architecture, and could equally well find application in a distributed, or peer-to-peer, architecture system, for example. The various publication system 142, payment system 144, and content ordering system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
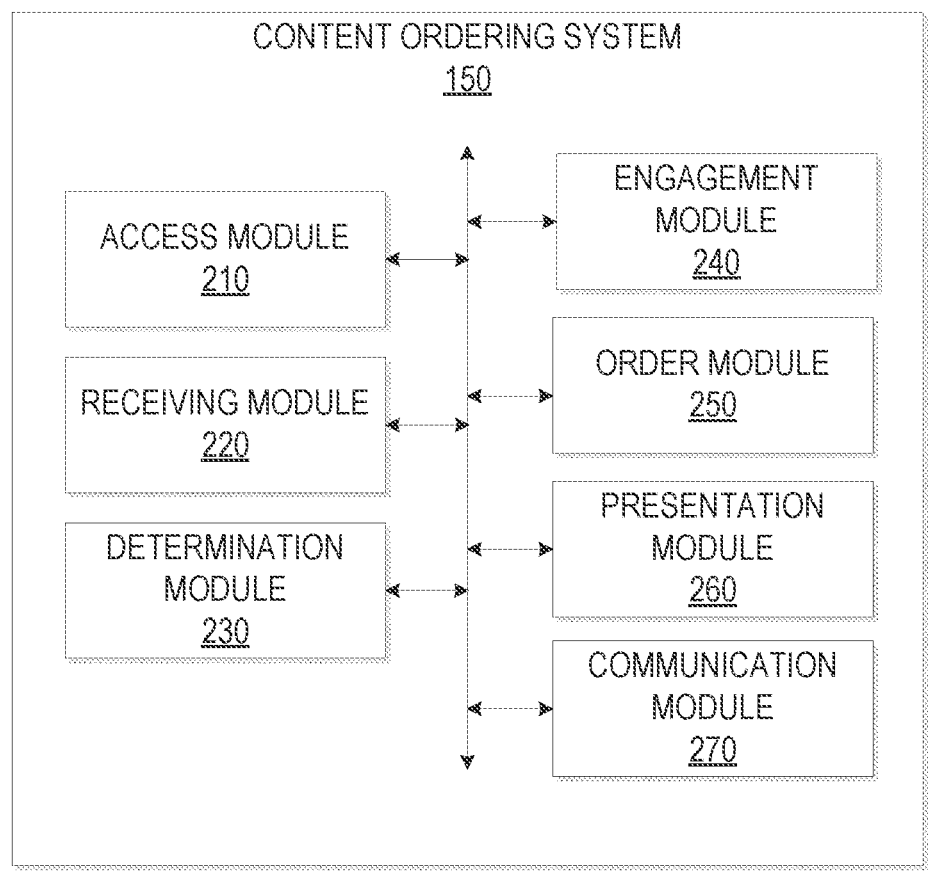
FIG. 2 is a block diagram illustrating components of a content ordering system suitable for dynamically generating an order for discrete content segments within a content stream.

FIG. 2 is a block diagram illustrating components of the content ordering system 150, according to some example embodiments. The content ordering system 150 is shown as including an access module 210, a receiving module 220, a detection module 230, an engagement module 240, an order module 250, a presentation module 260, and a communication module 270, all configured to communicate with each other (e.g., via a bus, shared memory, or a switch). Any one or more of the modules described herein may be implemented using hardware (e.g., at least one processor of a machine) or a combination of hardware and software. For example, any module described herein may configure a processor (e.g., among one or more processors of a machine) to perform one or more of the operations for which that module is designed. Moreover, any two or more of these modules may be combined into a single module, and the functions described herein for a single module may be subdivided among multiple modules. Furthermore, according to various example embodiments, modules described herein as being implemented within a single machine, database 126, or device may be distributed across multiple machines, databases 126, or devices.

The access module 210 accesses, receives, or otherwise obtains data from one or more systems, databases, or components. The access module 210 is configured to access a set of discrete content segments. In some embodiments, the set of discrete content segments can be stored on the database 126 of the network-based publication system 142. In other embodiments, the access module 210 may access the set of discrete content segments stored on a database 133 associated with the broadcast system 136. In some instances, the access module 210 accesses the discrete content segments at a time prior to commencement of the media stream from the broadcast system 136 or at the time of transmission of the media stream by the broadcast system 136.

The receiving module 220 receives event data of the media stream from the broadcast system 136. In some embodiments, the receiving module 220 receives sensor data from a set of sensors at a display location for the media stream. The receiving module 220 can receive sensor data from a plurality of sets of sensors located at a plurality of different display locations. Each set of sensors of the plurality of sensors may transmit a discrete stream or set of sensor data to be received by the receiving module 220. In some embodiments, the receiving module 220 may receive the sensor data in a continuous or semi-continuous stream during a time period in which the media stream is being transmitted by the broadcast system 136.

In some instances, the receiving module 220 may receive bursts or periodic sensor data. The bursts or periodic sensor data may be indicative of a sensor acquiring the sensor data during set periods of time (e.g., the sensor activates every one, three, or five minutes), upon receiving an input (e.g., the sensor is triggered by motion or sound), as discrete packets (e.g., the sensor takes a single image or series of images), or by any other suitable method. The sensor data received from each display location of the plurality of different display locations may be distinct from sensor data received from other display locations, and may cause differing orders to be imposed on the content stream, as discussed in more detail below.

The detection module 230 may be understood as a module configured to parse the media stream. The detection module detects a set of event instances from the event data depicted by the media stream. In some embodiments, the detection module 230 may detect the set of event instances from image recognition or other processing of the media stream. The detection module 230 may detect the set of event instances from metadata (e.g., closed captioning data, announcer commentary, or other sources of metadata) associated with or included within the media stream.

The engagement module 240 generates a set of emotion indicators based on the sensor data. The set of emotion indicators represents an emotional state of one or more subjects perceived by the set of sensors at a display location. In some embodiments, the set of emotion indicators may be based on sensor data representing one or more indicators selected from a group consisting of a facial feature, a body position (e.g., posture, proximity of a body to the sensor, and the like), a volume of conversation, and a content of conversation.

In some embodiments, the engagement module 240 generates a set of attention factors based on the sensor data. The set of attention factors represents an estimation of a level of attention paid, by one or more subjects perceived by the set of sensors, to the media stream. In some embodiments, the set of attention factors may be based on sensor data representing one or more indicators selected from a group comprising subject proximity to a sensor, a number of subjects perceived by the sensor (e.g., the number of subjects the sensor currently perceives), a subject facial orientation, a subject body orientation, a subject facial expression, a volume level of the subjects, a conversation indicator of the subjects (e.g., content of the conversation, direction of the conversation, etc.), and other characteristics or physical positioning of the one or more subjects perceived by the sensor.

The order module 250 is configured to generate an order for the set of discrete content segments of the content stream. In some embodiments, the order module 250 generates an order where the set of discrete content segments includes no prior order. In some instances, the set of discrete content segments includes a first order when accessed by the access module 210. In embodiments where the set of discrete content segments includes a first order, the order module 250 may generate a second order for the set of discrete content segments. The order module 250 may determine the order based on the set of event instances. In some embodiments, the order module 250 may determine the order based on the set of event instances and a set of ordering factors for the set of discrete content segments.

Where the receiving module 220 receives sensor data for a display location, the order module 250 can generate the order based on one or more of the set of event instances, the set of ordering factors, and the sensor data. In these instances, the order module 250 may generate the order for the display location associated with the sensor data. In this way, the order module 250 may generate a distinct order for each display location for which the receiving module 220 receives sensor data. Further, in some embodiments, the order module 250 may generate the order based on one or more of the set of emotion indicators, the set of attention factors, the set of event instances, the set of ordering factors, a set of engagement indicators, and the sensor data.

The presentation module 260 causes presentation of the set of discrete content segments within the content stream according to the order determined by the order module 250. For example, the presentation module 260 can generate the content stream, and the included set of discrete content segments, on a display device associated with the client device 110. The presentation module 260 may cause presentation of the content stream by transmitting the content stream and appropriate display instructions to the client device 110, displaying the content stream on the client device 110, generating one or more screens or web pages, or any other suitable method. Although embodiments are discussed with reference to a display device, it should be understood that the presentation module 260 can cause presentation of the content stream and the set of discrete content segments in any suitable manner or combination of manners (e.g., audio only, video only, still pictures, audio and video, still pictures and audio, etc.).

The communication module 270 enables communication among the client device 110, the content ordering system 150, the publication system 142, and one or more external systems (e.g., the payment system 144, the broadcast system 136, or other systems). In some example embodiments, the communication module 270 can enable communication among the access module 210, the receiving module 220, the detection module 230, the engagement module 240, the order module 250, and the presentation module 260. The communication module 270 can be a hardware implemented module, a software implemented module, or a combination thereof, as described in more detail below. For example, the communication module 270 can include communications mechanisms such as an antenna, a transmitter, one or more buses, and other suitable communication mechanisms capable of enabling communication between the modules 210-260, the client device 110, the content ordering system 150, the publication system 142, the payment system 144, or the broadcast system 136.

Figure 3:
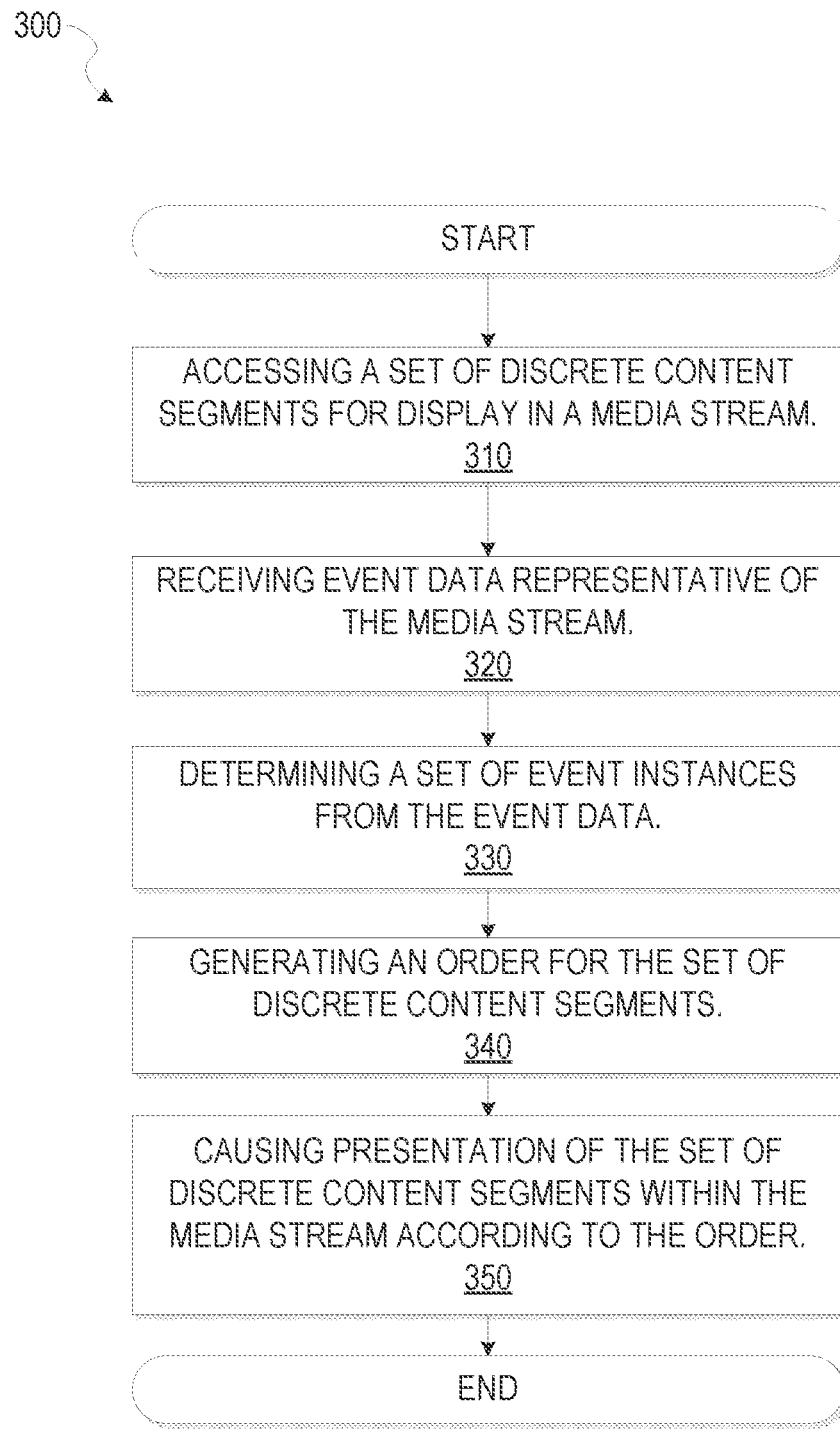
FIG. 3 is a flow diagram illustrating operations of a method for dynamically generating an order for discrete content segments using hardware modules of the content ordering system of FIG. 2, according to some example embodiments.

FIG. 3 is a flow chart of operations of the content ordering system 150 in performing a method 300 of ordering content for transmission within a content stream, according to some example embodiments. Operations in the method 300 may be performed by the content ordering system 150, using modules described above with respect to FIG. 2. In some embodiments, the operations of the method 300 can be performed using the modules of FIG. 2, where portions of the modules may be implemented on client devices, such as the client device 110, or on the broadcast system 136.

In operation 310, the access module 210 accesses a set of discrete content segments for display in a media stream. The access module 210 may access the set of discrete content segments stored on the database 126 via the communication module 270. In some embodiments, the set of discrete content segments may be stored in a database of the broadcast system 136, and accessed using one or more requests and responses of the access module 210 transmitted by the communication module 270. The access module 210 may also access the discrete content segments across multiple databases on one or more systems. In these embodiments, the access module 210 may transmit the discrete content segments, accessed on different systems, to a central database (e.g., the database 126) to create the set of discrete content segments, or to another module for completion of the method 300.

Each discrete content segment of the set of discrete content segments may include a content and a set of ordering factors. The set of ordering factors may be understood to be a set of conditions guiding ordering and display of the discrete content segment. The ordering factors may be determined by the producer or owner of the discrete content segment, a third party entity (e.g., FCC), or any other entity having rights to distribute or limit distribution of the discrete content segment. For example, the discrete content segment may be advertisement.

In some embodiments, the set of ordering factors may include a set of event factors understood to be events (e.g., a baseball player hitting a home run, a quarterback in a football game being sacked, a musical guest playing on a live broadcast of a comedy or variety show, a dramatic moment of a scripted television program, etc.), actions, keywords (e.g., keywords spoken by a person during a show, a keyword displayed on a closed caption system, a keyword displayed in a scrolling or static chyron displayed on the client device 110, etc.), time periods (e.g., entering a fourth quarter of a sporting event), or other suitable event factors. In some embodiments, the actions can be directly related to the media stream or indirectly related to the media stream.

Actions directly related to the media stream may be understood to be actions being displayed, spoken, or otherwise happening within the media stream. For example, the directly related actions could include a player signaling a time-out, a referee stopping a game to review a play, an announcer commenting on a play, and the like. By way of further example, actions directly related to the media stream can include aspects of the media stream perceived by image, video, or speech recognition systems. Exemplary aspects of the media stream can include referee signals; banners (e.g., chyrons) indicating scoring, actions of players, or the like; referee signals (e.g., as perceived by image/video/speech recognition systems); and other aspects directly related to the media stream or depicting portions of the media stream. In some instances, image or video recognition systems may include image recognition modules capable of receiving images, video, or live video using image sensors and processing the images, video, or live video to identify patterns, words, motions, or other items to recognize the aspects of the media stream. The audio recognition system can include audio recognition modules (e.g., speech recognition modules, noise recognition modules, etc.) along with one or more microphone or other audio sensor to identify and discern between types or wave forms of audio data to recognize the aspects of the media stream. In some embodiments, indirectly related actions can include actions of one or more subjects perceived by the sensors, as will be explained in more detail below.

Indirectly related actions could include, for example, one or more subjects viewing the media stream cheering for an event, shouting toward the client device 110, jumping, sitting down, turning away from the client device 110, or any other suitable action. The event factors may indicate one or more events of the set of events depicted in the media stream after which a discrete content segment is to be displayed.

In some instances, the set of ordering factors may include a set of distribution factors understood to be conditions for inclusion of a discrete content segment into the content stream. These distribution factors may be independent of the set of events within the media stream. For example, the distribution factors may be indicative of a relationship between the producer of a discrete content segment and a broadcast or publishing entity on whose signal the discrete content segment is to be transmitted. In some embodiments, the set of distribution factors may be selected from a group comprising an association among one or more discrete content segments of the set of discrete content segments, a distribution total for the discrete content segment, a bid price of the discrete content segment, or a total price paid for a subset of related discrete content segments.

In operation 320, the receiving module 220 receives event data representative of the media stream. The event data may be understood broadly as a content of the media stream, or more specifically, aspects of the content of the media stream which may be contextually related to or capable of affecting reception of a discrete content segment (e.g., an advertisement) by an audience of the media stream. In some embodiments, the event data may be an aggregation of common and uncommon occurrences within a portion of the media stream (e.g., a sporting event, a live television event, a scripted program) which may have an effect on the reception of the discrete content segment (e.g., an advertisement) and may be difficult to predict prior to their occurrence within the media stream. The receiving module 220 may receive the event data by receiving the media stream from the broadcast system 136, for example. In some embodiments, all or a portion of the event data may be transmitted along with the media stream as metadata associated with the media stream. The metadata may be a reflection of the event data, such as closed captioning data, announcer commentary, or other sources of metadata.

The receiving module 220 may receive the event data directly from the broadcast system 136, receiving the transmission of the media stream via a network, a broadcast transmission, or any other suitable communication method. In some embodiments, at least a portion of the receiving module 220 may be implemented in the broadcast system 136, such that the receiving module 220 directly receives the media stream and passes the event data from the media stream back to the content ordering system 150. In some instances, the receiving module 220 may receive the event data through the client device 110, such that once the client device 110 receives the media stream, the client device 110 transmits all or a portion of the media stream to be received by the receiving module 220. Although a few methods of receiving the event data have been disclosed, it will be understood that other suitable methods of receiving one or more of the media stream and the event data may also be used.

In operation 330, the detection module 230 detect a set of event instances of from the event data depicted by the media stream. An event instance can be understood as a discrete instance of a set of possible occurrences within the media stream. For example, in a baseball game, the event data may include a plurality of runs or pitches, while an event instance can be a run amounting to a grand slam, a pitch which strikes a batter out, a pitch by a specified team, or the like. In some embodiments, the event instance may be one or more occurrences which act as a precursor or possible precursor to a desired event or occurrence. For example, the event instance in a sporting event, such as a football game, can be a series of successive downs by a team which place the team in a scoring position.

In operation 340, the order module 250 generates an order for the set of discrete content segments for transmission within the content stream. The order may be generated based on the set of event instances and the set of ordering factors for each discrete content segment of the set of discrete content segments. The order module 250 may generate the order based on a weighted function receiving the set of ordering factors (e.g., the set of event factors and the set of distribution factors) for each of the discrete content segments and the set of event instances as inputs to the weighted function. In some embodiments, the set of discrete content segments may be provided in a predetermined first order for presentation within the content stream. In these instances, the order module 250 may generate a second order for the set of discrete content segments.

In some embodiments, the order module 250 determines the order of the set of discrete content segments using one or more segment matrices. The one or more segment matrices may plot each discrete content segment within a segment matrix, for example, by plotting one or more of the ordering factors against a monetary value. The monetary value may represent a fixed price paid by the producer of the discrete content segment, a bid for placement of the discrete content segment, or any other monetary value the producer may promise to pay for placement of the discrete content segment within the content stream or the media stream. As discussed, the one or more segment matrices may provide a cost related context to the set of discrete content segments used as input for the order module 250.

For example, upon receiving an event instance of a touchdown in a football game, the order module 250 may determine one or more discrete content segments from the set of discrete content segments having an ordering factor of the set of ordering factors relating to a touchdown. The order module 250 may order the set of discrete content segments such that the discrete content segments having an ordering factor relating to a touchdown (e.g., the discrete content segment is to be displayed after a touchdown) are placed in a relative order. For example, the discrete content segment may be placed toward the front of the order or toward the end of the order when the audience is more likely to be viewing the client device 110. The order module 250 may determine the position of the set of discrete content segments, from their relative order, using the monetary value associated with the discrete content segments. For example, the order module 250 may place the discrete content segments having a higher monetary value into a more prominent position within the relative order. In some embodiments, the order module 250 may prioritize the ordering factor over the monetary value in order to generate a better contextual fit between the event instance and the set of discrete content segments.

Further, in some instances, the order module 250 may prioritize a discrete content segment within the order based on a second segment matrix. For example, the order module 250 may determine a first order based on the event instance, the ordering factors, and the monetary value. The order module 250 may then determine, using the second segment matrix, that two discrete content segments are to be played back-to-back in an order or within a predetermined number of discrete content segments from one another. The order module 250 may then reorder the first order into a second order to satisfy the ordering factor of the second segment matrix.

In some embodiments, the method 300 may include operation 350. In operation 350, the presentation module 260 causes presentation of the set of discrete content segments within the media stream according to the order determined by the order module 250 in operation 340. The set of discrete content segments may be interspersed into the media stream in the order generated by the order module 250. In some embodiments, the set of discrete content segments may be interspersed into the media stream by inserting the set of discrete content segments into the data stream representing the media stream such that the set of discrete content segments becomes an integrated portion of the media stream. In other instances, the set of discrete content segments may be interspersed by substituting the set of discrete content segments for portions of the media stream without integrating the two streams. For example, the client device 110 may receive transmission of both the content stream and the media stream. At intervals during the transmission of the media stream, the client device 110 may display one or more of the set of discrete content segments. After display of the one or more discrete content segments, the client device 110 may resume display of the media stream.

In some embodiments, the set of discrete content segments may be interspersed into the media stream in subsets (e.g., bundles of multiple discrete content segments) such that portions of the media stream are presented between subsets of the set of discrete content segments. In some instances, the set of discrete content segments may be dispersed within the media stream spaced apart by time intervals. The time intervals may be evenly distributed during the transmission of the media stream. In some instances, the time intervals may be dynamically distributed during the transmission of the media stream such that some of the time intervals may be shorter or longer than other time intervals.

Figure 4:
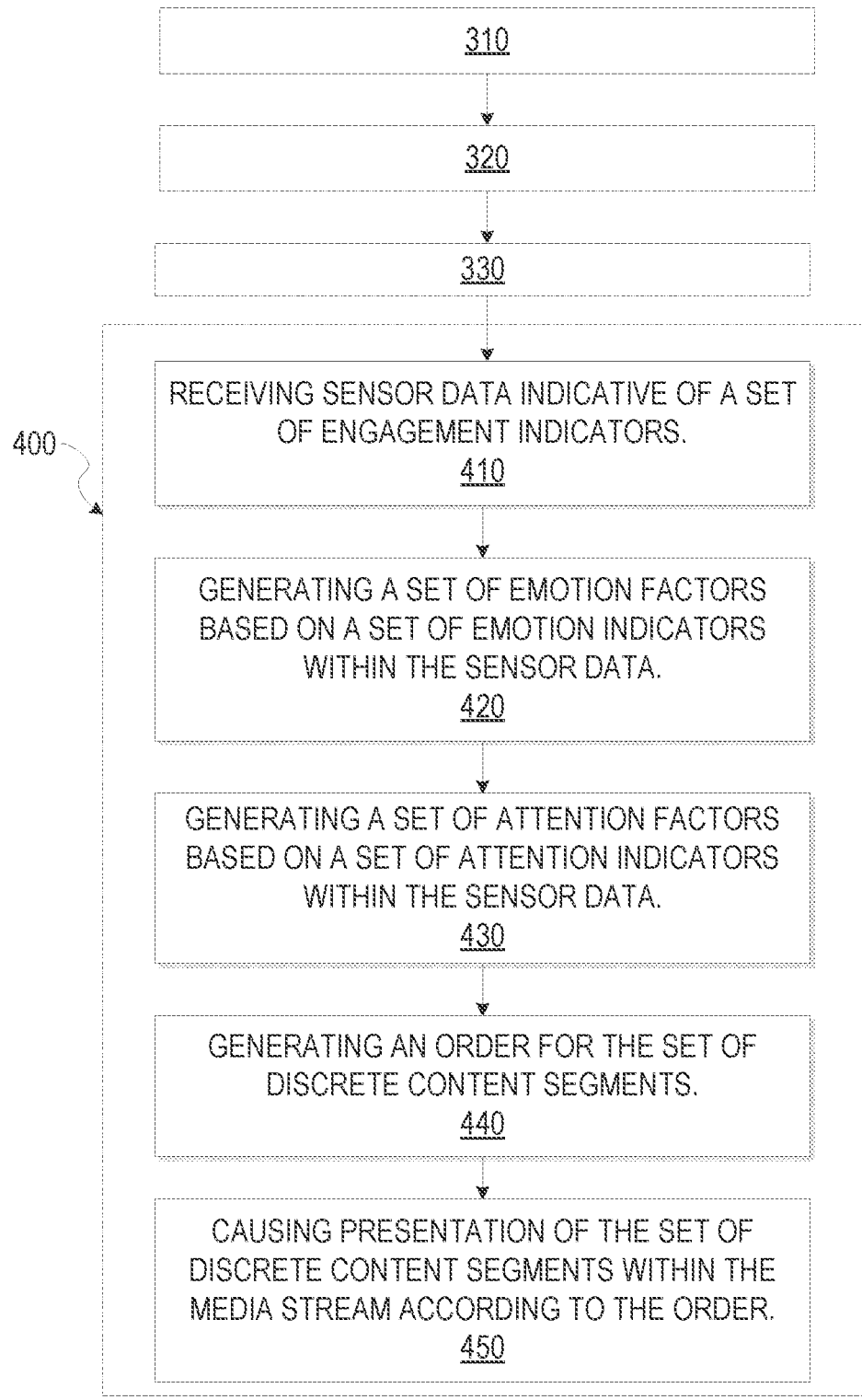
FIG. 4 is a flow diagram illustrating operations of a method for dynamically generating an order for discrete content segments using hardware modules of the content ordering system of FIG. 2, according to some example embodiments.

FIG. 4 is a flow chart of operations of the content ordering system 150 in performing a method 400 of ordering content for transmission within a content stream, according to some example embodiments. Operations in the method 400 may be performed by the content ordering system 150, using modules described above with respect to FIG. 2. In some embodiments, the operations of the method 400 can be performed using modules implemented at least in part on client devices, such as the client device 110, or on the broadcast system 136.

The method 400 may be performed by initially executing operations 310, 320, and 330, described above. In operation 410, the receiving module 220 receives sensor data indicative of a set of engagement indicators. The engagement indicators may be understood as data indicating various levels of engagement of one or more subjects with the media stream. The engagement indicators indicate the levels of engagement by representing actions of one or more subjects perceived by the sensor during display of the media stream.

In some embodiments, the engagement indicators include a set of emotion indicators and a set of attention indicators. The emotion indicators can be understood as actions, characteristics, or positions of a subject indicative of an emotional state or response. As such, the emotion indicators may represent an emotional state of one or more subjects perceived by the set of sensors at a display location. In some embodiments, the set of emotion indicators may be based on sensor data representing one or more characteristics selected from a group consisting of a facial feature (e.g., a frown, a smile, a furrowed brow, wide eyes indicating surprise, etc.), a body position (e.g., posture, proximity of a body to the sensor, and the like), a volume of conversation, a pace of conversation, a content of conversation, a lack of conversation, and the like.

The attention indicators may be understood as actions, characteristics, or positions of a subject indicative of the subject's level of attention directed to the media stream. These attention indicators may represent whether one or more subjects perceived by the set of sensors at the display location are actively consuming, passively consuming, or ignoring the media stream. Active consumption of a media stream can be understood as the one or more subjects paying direct attention to the associated content, while passive consumption can be understood as the one or more subjects having their attention divided between the media stream and another point of attention (e.g., another content stream, a conversation with another subject, a book, etc.). In some embodiments, the set of attention indicators may be based on sensor data representing one or more characteristics selected from a group comprising one or more of a subject proximity to a sensor, a number of subjects perceived by the sensor, a subject facial orientation (e.g., the subject positioning their face or eyes toward or away from the client device 110), a subject body orientation (e.g., a subject sitting down, a subject standing, a subject's shoulders positioned parallel to the client device 110, a subject's shoulders being at an angle to the client device 110, the subject lying down, etc.), and other suitable characteristics capable of indicating a focus of attention of the subject.

In some embodiments, the receiving module 220 may employ the set of sensors 118 within or associated with the client device 110 to determine the emotion indicators and the attention indicators. In some embodiments, the receiving module 220 may pass the raw sensor data, including the emotion indicators and the attention indicators, to another module or application for analysis to identify the emotion indicators and attention indicators. For example, the receiving module 220 may be in communication with the engagement module 240, which may be capable of providing facial recognition processes for identifying facial features, expressions, and orientations of subjects perceived by the set of sensors 118. The engagement module 240 may also include voice analysis processes for determining conversation and conversation content from general noise (e.g., ambient noise, cheering, etc.). The engagement module 240 may further include processes capable of determining proximity of the subject to the set of sensors 118 and the number of subjects in the room. The engagement module 240 may also include processes for pattern recognition to determine aspects and characteristics of the subjects perceived by the sensor. For example, the pattern recognition processes may determine wall decoration or jersey colors and patterns to determine a team affiliation of the subjects consuming a media stream including a sporting event.

In operation 420, the engagement module 240 generates a set of emotion factors based on the set of emotion indicators within the sensor data. The emotion factors may be understood as a set of data representative of the set of emotion indicators. The emotion factors are configured as input into the order module 250 for determining an order for the set of discrete content segments. In some embodiments, the emotion factors may be a set of data values representing a facial feature, a volume of conversation, a content of conversation, and the like received in the sensor data.

In operation 430, the engagement module 240 generates a set of attention factors based on the set of attention indicators within the sensor data. The attention factors may be understood as a set of data representative of the set of attention indicators. The attention factors are configured to provide input into the order module 250 for determining an order for the set of discrete content segments. In some embodiments, the attention factors may be a set of data values representing a subject proximity to the sensors, a number of subjects perceived by the sensor, a subject facial orientation relative to the sensor or the client device 110, a subject body orientation relative to the sensor or the client device 110, or the like received in the sensor data.

In operation 440, the order module 250 generates an order for the set of discrete content segments based on the set of event instances, the set of ordering factors for the set of discrete content segments, the set of emotion factors, and the set of attention factors. In some embodiments, operation 440 may be implemented similarly to operation 340. For example, the order module 250 may reference a plurality of segment matrices mapping the set of discrete content segments to the ordering factors and monetary values. The set of emotion factors and the set of attention factors may be used in conjunction with the set of event instances to weight and order the set of discrete content segments based on a determination of contextual appropriateness of a given discrete content segment for the set of subjects consuming the media stream and the events preceding presentation of the discrete content segment.

In some embodiments, the method 400 may include operation 450, in which the presentation module 260 causes presentation of the set of discrete content segments within the media stream according to the order determined by the order module 250 in operation 440. In some embodiments, operation 450 can be performed similarly to operation 350, described above.

Figure 5:
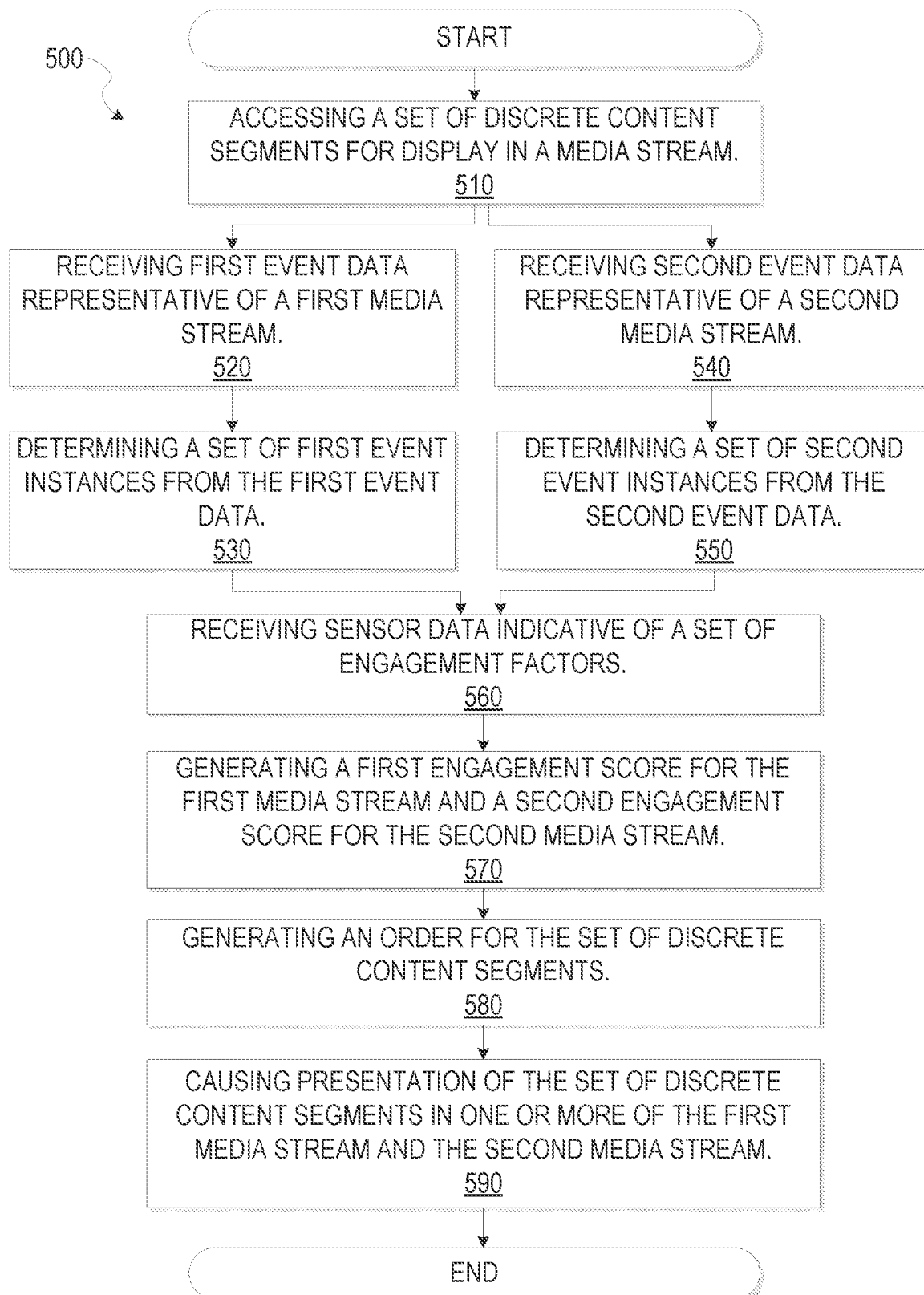
FIG. 5 is a flow diagram illustrating operations of a method for dynamically generating an order for discrete content segments using hardware modules of the content ordering system of FIG. 2, according to some example embodiments.

FIG. 5 is a flow chart of operations of the content ordering system 150 in performing a method 500 of ordering content for transmission within a content stream, according to some example embodiments. Operations in the method 500 may be performed by the content ordering system 150, using modules described above with respect to FIG. 2. In some embodiments, at least a portion of one or more of the modules may be implemented on a client device, such as the client device 110, or the broadcast system 136.

In operation 510, the access module 210 accesses a set of discrete content segments for display in a media stream. The access module 210 may access the set of discrete content segments stored on the database 126 or a database of the broadcast system 136 via the communication module 270. In some embodiments, operation 510 may be performed similarly to or the same as operation 310.

In operation 520, the receiving module 220 receives first event data representative of a first media stream. In some embodiments, the first media stream may be a media stream in which the set of discrete content segments is to be presented. In some instances, the set of discrete content segments may be distributed among a plurality of media streams. In some embodiments, operation 520 can be performed similarly to operation 320.

In operation 530, the detection module 230 detects a set of first event instances from the first event data depicted by the first media stream. In some instances, operation 530 may be performed similarly to operation 330.

In operation 540, the receiving module 220 receives second event data representative of a second media stream. In some embodiments, the second media stream may be a media stream being displayed at the same display location as the first media stream, where the first media stream is displayed on a first client device and the second media stream is displayed on a second client device. In some instances, operation 540 may be performed similarly to operation 320.

In some embodiments, the receiving module 220 may receive the second event data through the set of sensors associated with the client device 110 displaying the first media stream. In these instances, the content ordering system 150 may have no direct access to the second media stream, but receive the second event data through indirect means.

In operation 550, the detection module 230 detects a set of second event instances from the second event data depicted by the second media stream. In some instances, operation 550 may be performed similarly to operation 330.

In operation 560, the receiving module 220 receives sensor data indicative of a set of engagement indicators. The engagement indicators may be engagement indicators as described above with respect to FIG. 4. In some instances, one or more of the set of engagement indicators may be indicative of attention directed to either the first media stream or the second media stream. For example, a set of attention indicators within the engagement indicators may indicate facial or body positioning of one or more subjects relative to the first client device displaying the first media stream or the second client device displaying the second media stream. In some embodiments, operation 560 may be performed similarly to operation 410, described above.

In operation 570, the engagement module 240 generates a first engagement score for the first media stream and a second engagement score for the second media stream. In some embodiments, the engagement module 240 generates a first set of emotion factors and a first set of attention factors for the first media stream and a second set of emotion factors and a second set of attention factors for the second media stream. The engagement module 240 can generate the first engagement score based on the first set of emotion factors and the first set of attention factors and the second engagement score based on the second set of emotion factors and the second set of attention factors. In some embodiments, the first engagement score and the second engagement score are generated relative to one another to indicate whether the first media stream or the second media stream is the primary focus of the one or more subjects.

In operation 580, the order module 250 generates an order for the set of discrete content segments based on the set of first event instances, the set of second event instances, the set of ordering factors for the set of discrete content segments, the first engagement score, and the second engagement score. The order generated by the order module 250 may be a second order where the set of discrete content segments is transmitted to the content ordering system 150 with a specified first order. In some embodiments, the order generated by the order module 250 may include a set of orders dividing the set of discrete content segments between multiple client devices 110. In some embodiments, operation 580 may be performed similarly to operation 340, described above.

In operation 590, the presentation module 260 causes presentation of the set of discrete content segments in one or more of the first media stream and the second media stream. In at least some embodiments, operation 590 may be performed similarly to operation 350 or operation 450.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-5 are implemented in some embodiments in the context of a machine and an associated software architecture, a server and an associated software architecture, or combinations thereof. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the features of the present disclosure in different contexts from those presented herein.

Software Architecture

Figure 6:
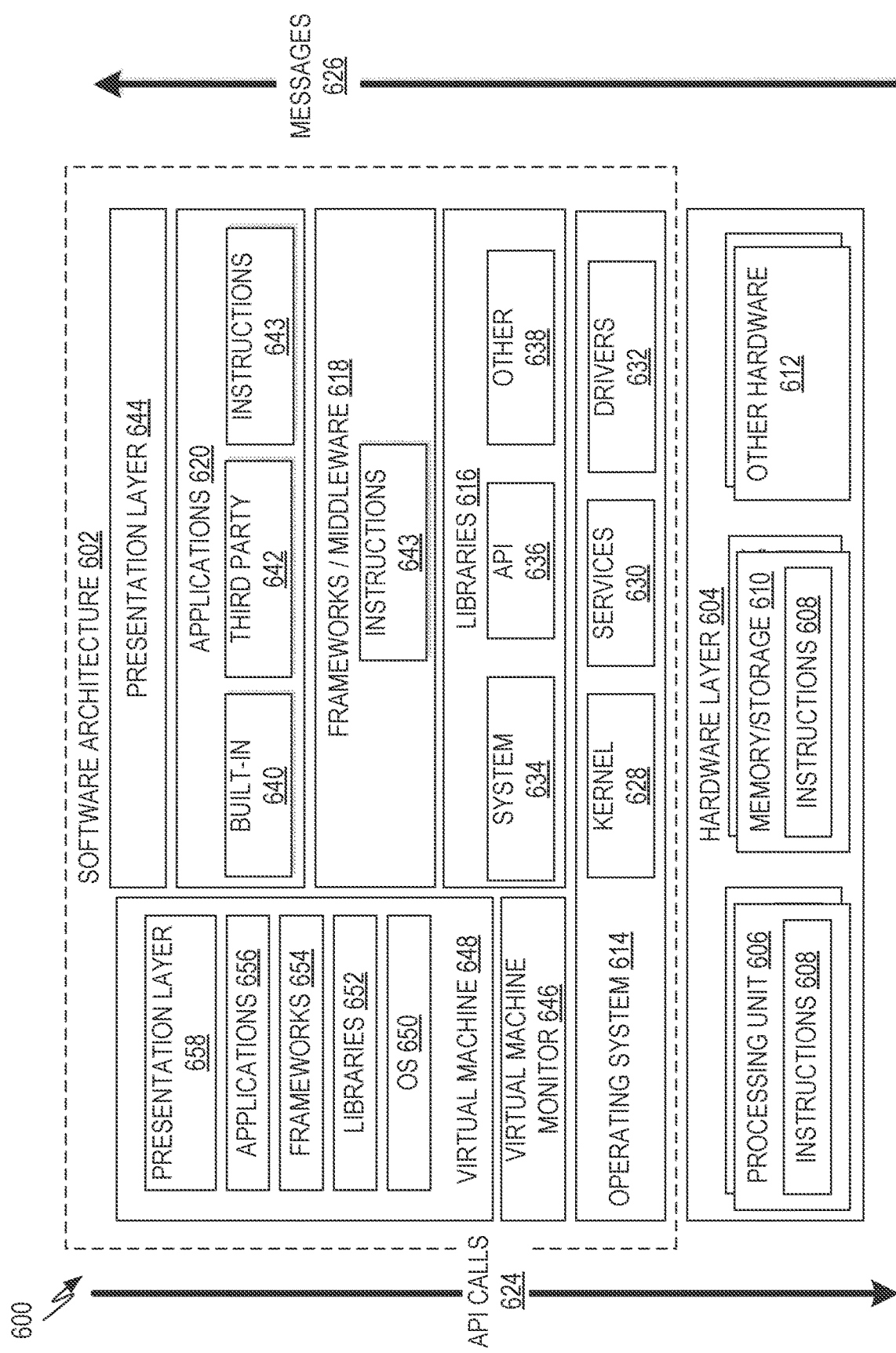
FIG. 6 is a block diagram illustrating an example of a software architecture that may be installed on a machine, according to some example embodiments.

FIG. 6 is a block diagram 600 illustrating a representative software architecture 602, which may be used in conjunction with various hardware architectures herein described. FIG. 6 is merely a non-limiting example of a software architecture, and it will be appreciated that many other architectures may be implemented to facilitate the functionality described herein. The software architecture 602 may be executed on hardware such as a machine 700 of FIG. 7 that includes, among other things, processors 710, memory 730, and I/O components 750. A representative hardware layer 604 is illustrated and can represent, for example, the machine 700 of FIG. 7. The representative hardware layer 604 comprises one or more processing units 606 having associated executable instructions 608. The executable instructions 608 represent the executable instructions of the software architecture 602, including implementation of the methods, modules, and so forth of FIGS. 1-5. The hardware layer 604 also includes memory and/or storage modules 610, which also contain the executable instructions 608. The hardware layer 604 may also comprise other hardware 612, which includes any other hardware of the hardware layer 604, such as the other hardware illustrated as part of the machine 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and a presentation layer 644. Operationally, the applications 620 and/or other components within the layers may invoke application programming interface (API) calls 624 through the software stack and receive a response, returned values, and so forth, illustrated as messages 626, in response to the API calls 624. The layers illustrated are representative in nature, and not all software architectures have all layers. For example, some mobile or special purpose operating systems may not provide a layer of frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render content in a 2D and 3D graphic context on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware 618 (also sometimes referred to as middleware) may provide a higher-level common infrastructure that may be utilized by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640, third party applications 642, and/or instructions 643 for operating a portion of the methods described above to be performed by the content ordering system 150. Examples of representative built-in applications 640 may include, but are not limited to, a contacts application, a browser application, a book reader application, a location application, a media application, a messaging application, and/or a game application. The third party applications 642 may include any of the built-in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 642 may invoke the API calls 624 provided by the mobile operating system such as the operating system 614 to facilitate functionality described herein.

The applications 620 may utilize built-in operating system functions (e.g., kernel 628, services 630, and/or drivers 632), libraries (e.g., system 634, APIs 636, and other libraries 638), and frameworks/middleware (e.g., frameworks/middleware 618) to create user interfaces to interact with users of the system. In some embodiments, a portion of the instructions 643 function as a part of the frameworks/middleware 618 to perform at least a portion of the methods described above to be performed by the content ordering system 150. Alternatively, or additionally, in some systems interactions with a user may occur through a presentation layer, such as the presentation layer 644. In these systems, the application/module "logic" can be separated from the aspects of the application/module that interact with the user.

Some software architectures utilize virtual machines. In the example of FIG. 6, this is illustrated by a virtual machine 648. A virtual machine creates a software environment where applications/modules can execute as if they were executing on a hardware machine (such as the machine of FIG. 7, for example). A virtual machine is hosted by a host operating system (e.g., operating system 614 in FIG. 6) and typically, although not always, has a virtual machine monitor 646, which manages the operation of the virtual machine as well as the interface with the host operating system (e.g., operating system 614). A software architecture, which may include an operating system 650, libraries 652, frameworks/middleware 654, applications 656, and/or a presentation layer 658, executes within the virtual machine 648. These layers of software architecture executing within the virtual machine 648 can be the same as corresponding layers previously described or may be different.

Example Machine Architecture and Machine-Readable Medium

Figure 7:
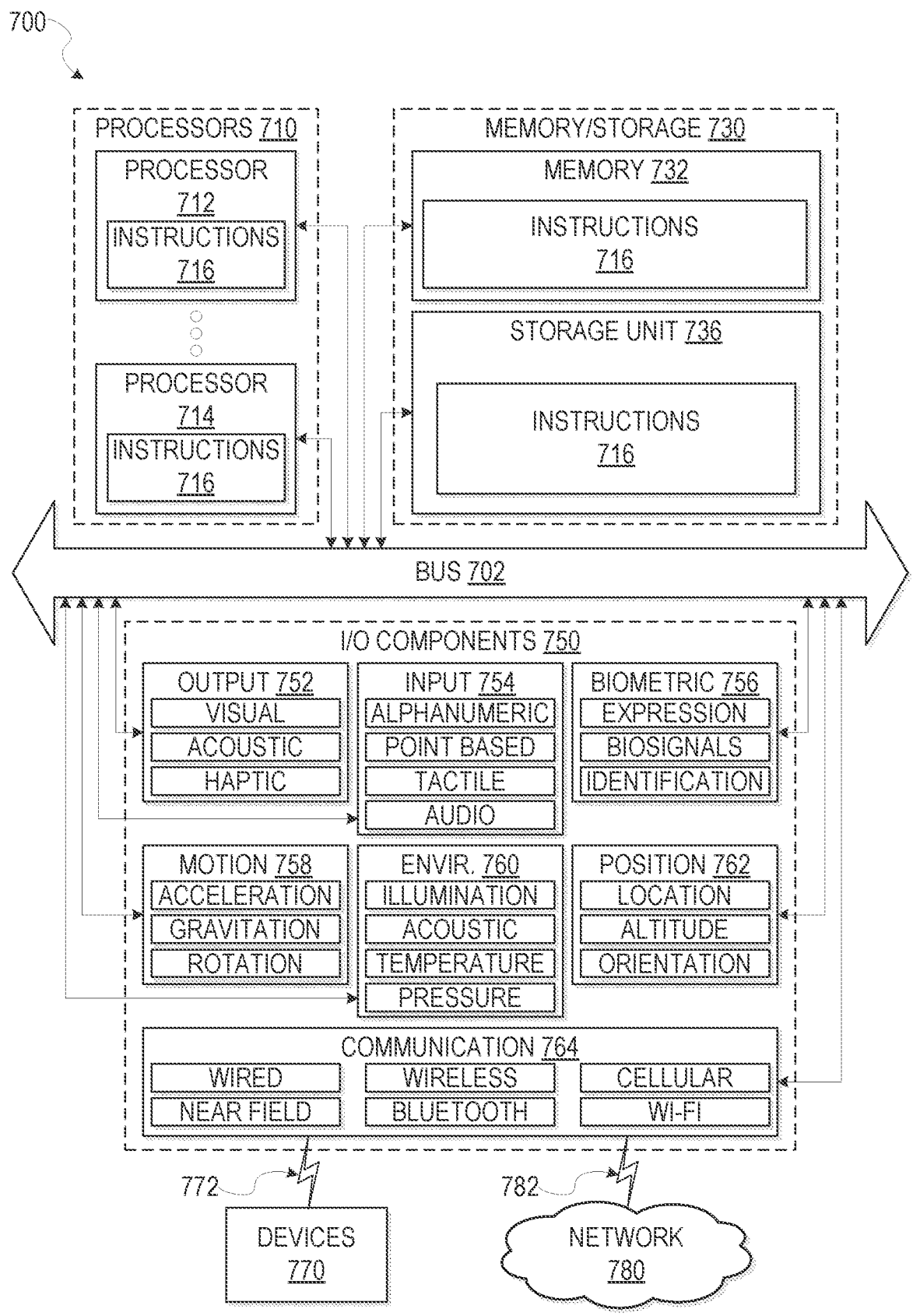
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions (e.g., processor-executable instructions) from a machine-readable medium (e.g., a non-transitory machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the flow diagrams of FIGS. 3-5. Additionally, or alternatively, the instructions 716 may implement the access module 210, the receiving module 220, the detection module 230, the engagement module 240, the order module 250, the presentation module 260, and the communication module 270 of FIG. 2, and so forth. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other, such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include a multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components (not shown), pressure sensor components (e.g., barometer), acoustic sensor components (e.g., one or more microphones that detect background noise), proximity sensor components (e.g., infrared sensors that detect nearby objects) (not shown), gas sensors (e.g., gas detection sensors to detect concentrations of hazardous gases for safety or to measure pollutants in the atmosphere) (not shown), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying instructions 716 for execution by the machine 700, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing content segments for display in a media stream, the media stream being distinct from the content segments;
   receiving event data representative of a set of events depicted by the media stream;
   presenting the media stream;
   receiving sensor data indicative of indicators associated with a subject at a presentation location of the media stream and associated with an event in the media stream;
   generating an order for the content segments based on the sensor data, the order being dynamically determined in real time based on the received sensor data corresponding to the event in the media stream; and
   causing presentation of the content segment within the media stream according to the order.

2. The method of claim 1, wherein a biometric sensor receives the sensor data and the indicators represent an emotional state of the subject at the presentation location, the emotional state relating to one of a facial feature of the subject, a body position of the subject, or a conversation associated with the subject.

3. The method of claim 2, further comprising generating a set of emotion factors based on actions of the subject directed to the media stream.

4. The method of claim 3, wherein the order for the content segments is based on the emotion factors.

5. The method of claim 1, wherein a biometric sensor receives the sensor data and the indicators represent actions of an attention of the subject directed to the media stream.

6. The method of claim 5, further comprising generating a set of attention factors based on the actions of the attention of the subject directed to the media stream.

7. The method of claim 6, wherein the order for the content segments is based on the attention factors.

8. A system comprising:
   one or more processors; and
   a machine-readable storage device comprising instructions that, when executed by the one or more processors, cause the one or more processors to perform operations comprising:

accessing content segments for display in a media stream, the media stream being distinct from the content segments;

receiving event data representative of a set of events depicted by the media stream;

presenting the media stream;

receiving sensor data indicative of indicators associated with a subject at a presentation location of the media stream and associated with an event in the media stream;

generating an order for the content segments based on the sensor data, the order being dynamically determined in real time based on the received sensor data corresponding to the event in the media stream; and causing presentation of the content segment within the media stream according to the order.

9. The system of claim 8, wherein a biometric sensor receives the sensor data and the indicators represent an emotional state of the subject at the presentation location, the emotional state relating to one of a facial feature of the subject, a body position of the subject, or a conversation associated with the subject.

10. The system of claim 9, wherein the operations further comprise generating a set of emotion factors based on actions of the subject directed to the media stream.

11. The system of claim 10, wherein the order for the content segments is based on the emotion factors.

12. The system of claim 8, wherein a biometric sensor receives the sensor data and the indicators represent actions of an attention of the subject directed to the media stream.

13. The system of claim 12, wherein the operations further comprise generating a set of attention factors based on the actions of the attention of the subject directed to the media stream.

14. The system of claim 13, wherein the order for the content segments is based on the attention factors.

15. A machine-readable storage device having no transitory signals and comprising instructions that, when executed by one or more processors of a machine, cause the machine to perform operations comprising:

accessing content segments for display in a media stream, the media stream being distinct from the content segments;

receiving event data representative of a set of events depicted by media stream;

presenting the media stream;

receiving sensor data indicative of indicators associated with a subject at a presentation location of the media stream and associated with an event in the media stream;

generating an order for the content segments based on the sensor data, the order being dynamically determined in real time based on the received sensor data corresponding to the event n the media stream; and causing presentation of the content segment within the media stream according to the order.

16. The machine-readable storage device of claim 15, wherein a biometric sensor receives the sensor data and the indicators represent an emotional state of the subject at the presentation location, the emotional state relating to one of a facial feature of the subject, a body position of the subject, or a conversation associated with the subject.

17. The machine-readable storage device of claim 16, wherein the operations further comprise generating a set of emotion factors based on actions of the subject directed to the media stream.

18. The machine-readable storage device of claim 17, wherein the order for the content segments is based on the emotion factors.

19. The machine-readable storage device of claim 15, wherein a biometric sensor receives the sensor data and the indicators represent actions of an attention of the subject directed to the media stream.

20. The machine-readable storage device of claim 19, wherein the operations further comprise generating a set of attention factors based on the actions of the attention of the subject directed to the media stream.

* * * * *